(12) United States Patent
Pupilli et al.

(10) Patent No.: US 8,363,955 B2
(45) Date of Patent: Jan. 29, 2013

(54) APPARATUS AND METHOD OF IMAGE ANALYSIS

(75) Inventors: Mark Lloyd Pupilli, London (GB); Simon John Hall, London (GB)

(73) Assignee: Sony Computer Entertainment Europe Limited (GB)

( * ) Notice: Subject to any disclaimer, the term of this patent is extended or adjusted under 35 U.S.C. 154(b) by 398 days.

(21) Appl. No.: 12/680,644

(22) PCT Filed: Oct. 2, 2008

(86) PCT No.: PCT/GB2008/003347
§ 371 (c)(1),
(2), (4) Date: May 28, 2010

(87) PCT Pub. No.: WO2009/044148
PCT Pub. Date: Apr. 9, 2009

(65) Prior Publication Data
US 2010/0296699 A1    Nov. 25, 2010

(30) Foreign Application Priority Data

Oct. 5, 2007  (EP) .................................... 07253962

(51) Int. Cl.
*G06K 9/00* (2006.01)
*G06K 9/40* (2006.01)

(52) U.S. Cl. ......................... 382/199; 382/168; 382/266

(58) Field of Classification Search .................. 382/199, 382/261, 100, 103, 168, 169, 171, 172, 173, 382/181, 190, 209, 237, 254, 260, 266, 274, 382/276; 348/345, 222.1, 169; 345/418, 345/419, 421; 375/240.12, E7.081, E7.263, 375/E7.211, E7.12, E7.076, E7.088, E7.111; 707/705, 736, 741, 745

See application file for complete search history.

(56) References Cited

U.S. PATENT DOCUMENTS 7,356,254 B2 *   4/2008   Aoyama ...................... 396/147

FOREIGN PATENT DOCUMENTS

| JP | 06208623 A | 7/1994 |
|---|---|---|
| JP | 09259285 A | 10/1997 |
| JP | 2001101429 A | 4/2001 |
| JP | 2007058634 A | 3/2007 |
| JP | 2007233971 A | 9/2007 |
| WO | 2005124429 A1 | 12/2005 |

OTHER PUBLICATIONS

Japanese Office Action for JP 2010-527526 dated Mar. 21, 2012.

(Continued)

*Primary Examiner* — Sheela Chawan
(74) *Attorney, Agent, or Firm* — Lerner, David, Littenberg, Krumholz & Mentlik, LLP

(57) ABSTRACT

A method of analyzing a captured image comprising an instance of a target object comprises the steps of: for each of a plurality of different brightness threshold levels, generating contours from the captured digital image that indicate where in the captured digital image the pixel values of the captured digital image cross the respective brightness threshold level; identifying instances of a contour corresponding to a characteristic feature of said target object, the instances being detected at substantially similar image positions in the contours derived using at least two of the respective brightness threshold levels; and estimating a homography which maps the characteristic feature of the target object to its representation in the captured image, based upon the two or more instances of that target object's corresponding contour.

20 Claims, 12 Drawing Sheets

OTHER PUBLICATIONS

Rekimoto, "Augmented Reality using the 2D matrix code", Interactive system and software IV, Kindai kagaku sha Co., Ltd., Dec. 1996, pp. 199-208.

European Search Report, EP 07253962, dated Jan. 31, 2008.

International Search Report, PCT/GB2008/003347, dated Jan. 7, 2009.

Fiala M: "Comparing ARTag and ARToolkit plus fiducial marker systems" Haptic Audio Visual Environments and Their Applications, 2005 IREE International Worksho on Oct. 1, 2005. Piscataway, NJ, USA, IEEE, Oct. 1, 2005, pp. 147-152, XP010858685.

Bin Lee et al: "A dynamic programing based algonthm for optimal edge detection in medical images" Medical Imaging and Augmented Reality, 2001. Proceedings. International Workshop on Jun. 10-12, 2001, Piscataway, NJ, USA,IEEE, Jun. 10, 2001, pp. 193-198, XP010547526.

Pupilli et al: "Real-Time Camera Tracking Using Known 3D Models and a Particle Filter" Pattern Recognition, 2006. ICPR 2006. 18th International Conference on, IEEE, P1, 2006, pp. 199-203, XP031001418, Sep. 18, 2006.

Andrew P Gee et al: "Real-Time Model-Based SLAM Using Line Segments" Advances in Visual Computing Lecture Notes in Computer Science;;LNCS, Springer Berlin Heidelberg, BE, vol. 4292, 2006, pp. 354-363, XPO 19050854, 6-8, 2006.

http://studierstube.icg.tu-graz.ac.at/handheld_ar/artoolkitplus.php, Jun. 6, 2006.

http://www.pervasive.ifi.lmu.de/workshops/w3/papers_2005/PerGames2005_TARBoard_WLee, May 11, 2005.

* cited by examiner

APPARATUS AND METHOD OF IMAGE ANALYSIS

CROSS REFERENCE TO RELATED APPLICATIONS

The present application is a national phase entry under 35 U.S.C. § 371 of International Application No. PCT/GB2008/003347, filed Oct. 2, 2008, published in English, which claims the benefit of EP Patent Application No. 07253962.0, filed Oct. 5, 2007. The entire disclosures of each of the above-identified applications are incorporated by reference herein.

The present invention relates to an apparatus and method of image analysis.

Conventional augmented reality systems attempt to integrate virtual objects within a video capture of a real environment. This can take the form of a so-called 'magic window', where a combined camera and display are moved with respect to the real world, so that as real-world features come into view, corresponding virtual elements are added (e.g. see http://studierstube.icg.tu-graz.ac.at/handheld_ar/artoolkitplus.php). Alternatively, the camera can be fixed, and the position and orientation of a real-world object within the camera's view can be ascertained, allowing appropriate augmentation of the object—e.g. see http://www.pervasive.ifi.lmu.de/workshops/w3/papers_2005/PerGames2005_TARBoard_WLee.pdf This typically takes the form of a graphical overlay or associated virtual entity depicted in a manner consistent with the orientation of the real-world object.

There a number of problems associated with this latter form of augmented reality. The first problem is to identify and consistently determine the location and orientation of the real-world object (typically a cube or card with high-contrast markings). In a normal domestic or office environment, there may be many objects that may resemble the real world target object, and the shape of the target object may make its orientation ambiguous. The second problem is that the lighting by which such a real-world object is illuminated will vary from situation to situation, further complicating its identification. The third problem is to faithfully position the virtual object or enhancement with respect to the real world object so that their movements appear to correspond. Moreover, the problems must be overcome for a real-time video feed.

Embodiments of the present invention seek to address, mitigate or alleviate the above problems.

In a first aspect of the present invention, a method of analysing a captured image comprises the steps of: for each of a plurality of different brightness threshold levels, generating contours from the captured digital image that indicate where in the captured digital image the pixel values of the captured digital image cross the respective brightness threshold level; identifying instances of a contour corresponding to a characteristic feature of said target object, the instances being detected at substantially similar image positions in the contours derived using at least two of the respective brightness threshold levels; and estimating a homography which maps the characteristic feature of the target object to its representation in the captured image, based upon the two or more instances of that target object's corresponding contour.

In another aspect of the present invention, an image analysis apparatus comprises an image processor operable to generate, for each of a plurality of different brightness threshold levels, contours from a captured digital image that indicate where in the captured digital image the pixel values of the captured digital image cross the respective brightness threshold level; a feature identifier operable to identify instances of a contour corresponding to a characteristic feature of said target object, the instances being detected at substantially similar image positions in the contours derived using at least two of the respective brightness threshold levels; and a homography transform estimator operable to estimate a homography which maps the characteristic feature of the target object to its representation in the captured image based upon the two or more instances of that target object's corresponding contour.

Advantageously, by estimating a homography based upon contours generated at different respective brightness threshold levels, successive homographies for successive images in a video sequence show less variability in response to interframe changes in object lighting conditions. As a result, a digital augmentation applied to the image in dependence upon such a homography appears more stably coupled over time to the underlying target object in the image. In addition, by using a plurality of respective brightness threshold levels the need to calibrate or otherwise account for the encountered lighting conditions is mitigated.

Further respective aspects and features of the invention are defined in the appended claims, including corresponding methods of operation as appropriate.

Embodiments of the present invention will now be described by way of example with reference to the accompanying drawings, in which.

Figure 7A:
Figure 7B:
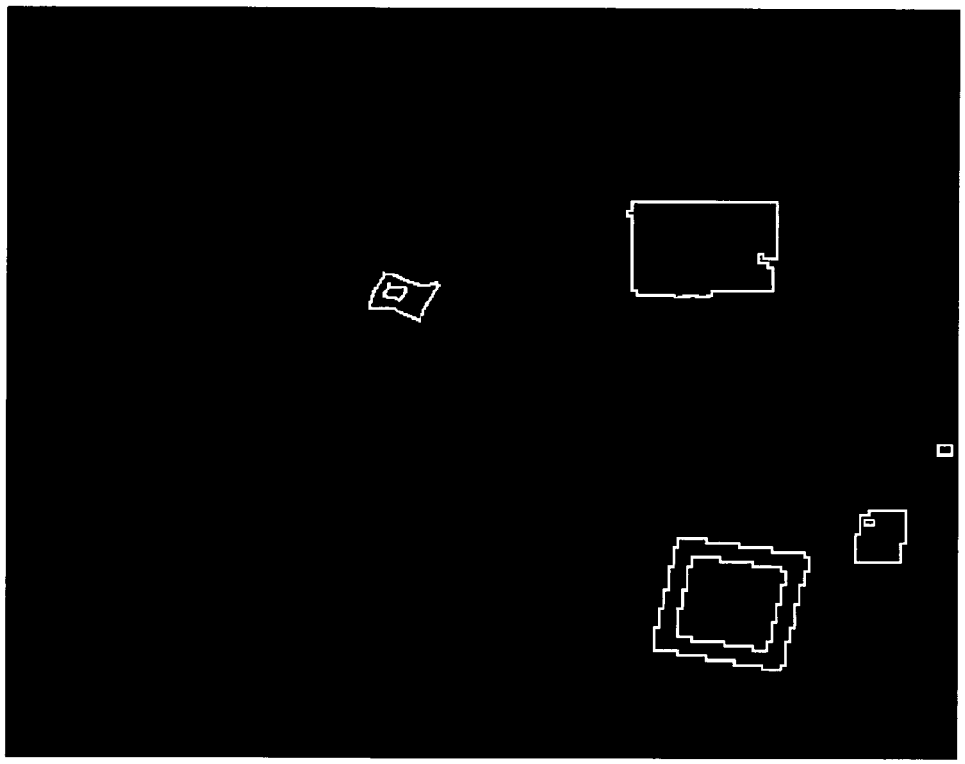
Figure 7C:
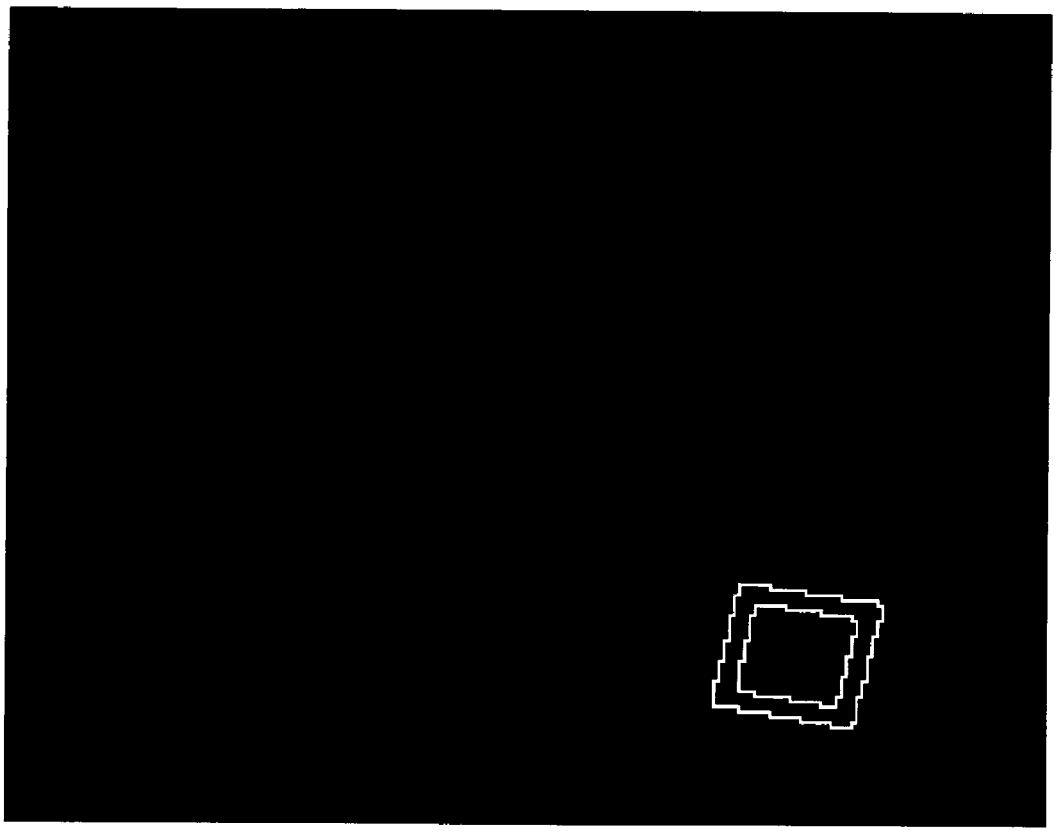
Figure 8:
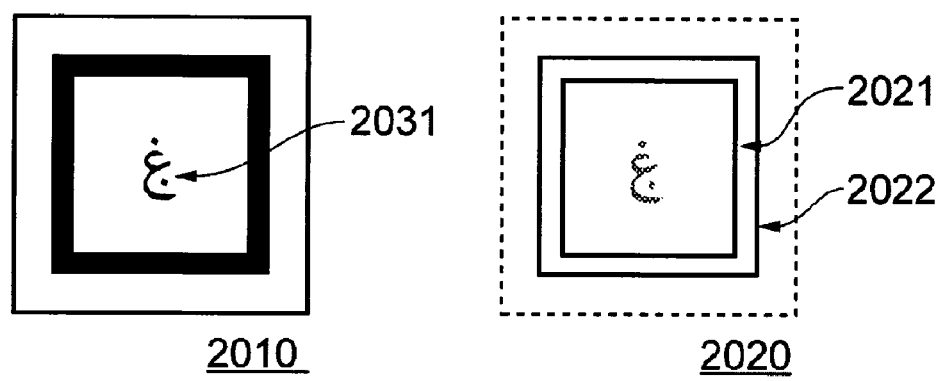
Figure 9A:
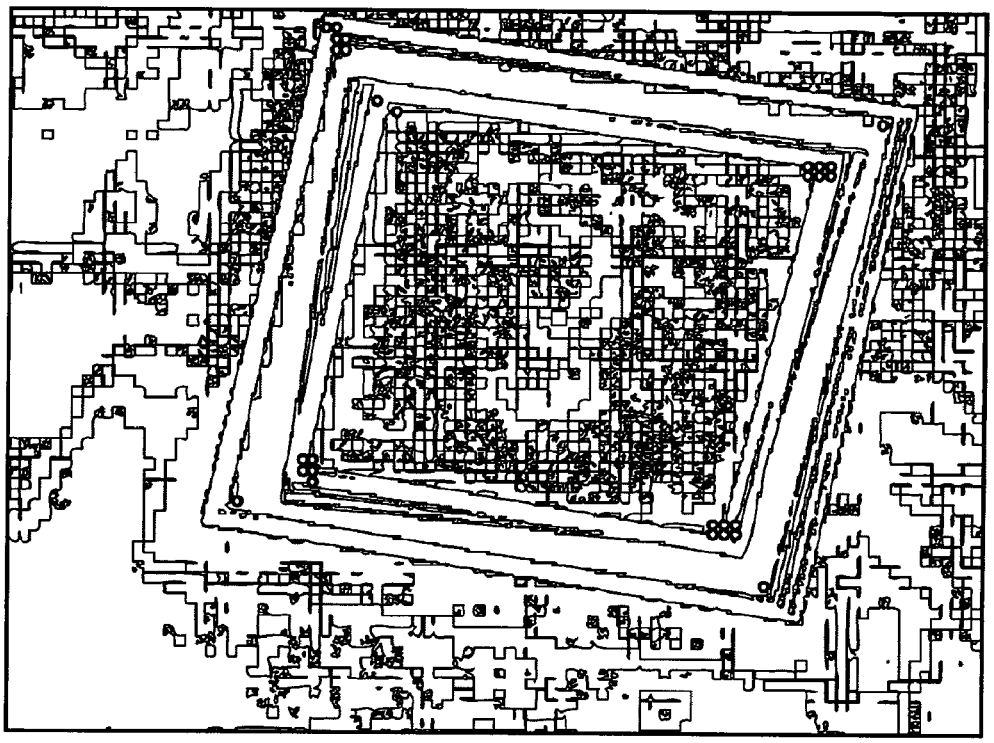
Figure 9B:
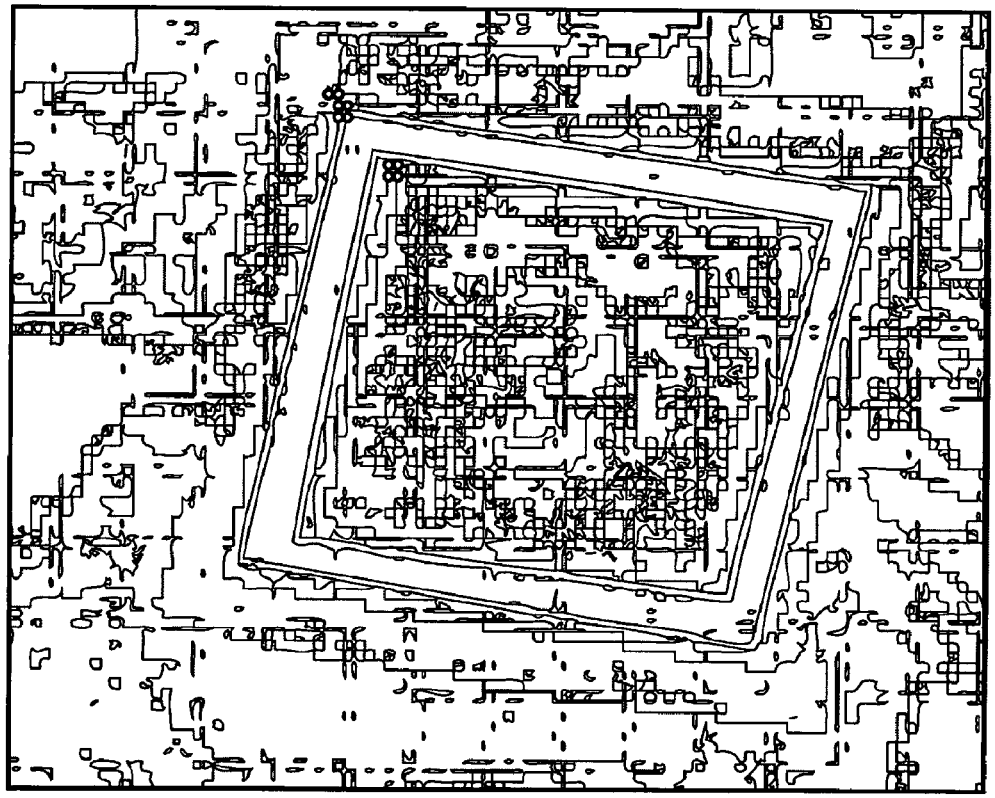
Figure 10A:
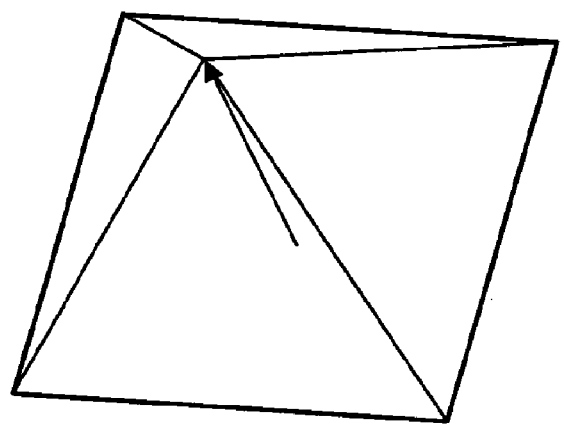
Figure 10B:
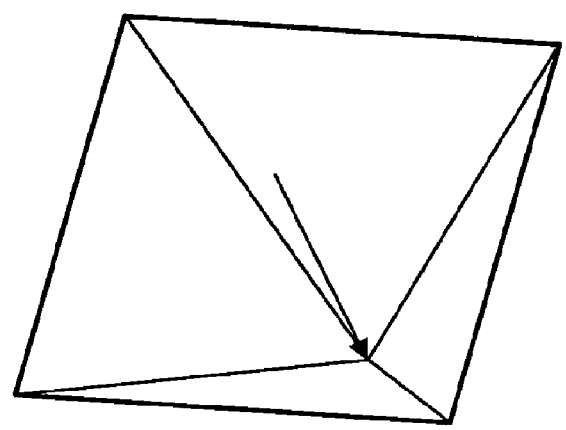

FIGS. 6A-E schematically illustrate an image capture and different black and white versions of the captured image generated by different black/white thresholds in accordance with an embodiment of the present invention;

FIGS. 7A-C schematically illustrate contours derived from a black and white version of the captured image in accordance with an embodiment of the present invention;

FIG. 8 is a schematic diagram of a target object and the resulting contour pattern in accordance with an embodiment of the present invention;

FIGS. 9A and 9B schematically illustrate position estimates of the target object in accordance with an embodiment of the present invention; and FIGS. 10A and 10B schematically illustrate the same contour fitting two alternative object orientations.

A method and apparatus of analysing images for augmented reality applications are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In a summary embodiment of the present invention, an apparatus comprising a video camera captures an image that incorporates at least one target object, the target object having some form of characteristic marking, and superposes within the image a virtual augmentation such as an graphical object or pattern with respect to that real-world target object. The placement of the virtual augmentation is thus dependent upon estimating the position and orientation of the or each target object within the captured image. This is achieved by identifying the contours of the characteristic markings in a black and white version of the captured image, and computing a transform or homography between these contours and a default position/orientation contour pattern. To mitigate variations in resolution, lighting and video noise between successive image captures that may otherwise impart random jitter to the positional estimate, contours are derived from a plurality of black and white versions of the original captured image, with each version using a different brightness threshold level for assigning black and white values so as to give a different effective light exposure. The resulting plurality of contour estimates for each respective target object are then used to generate a best-fit contour from which a homography for the or each respective target object is derived. A homography derived in such a manner is comparatively stable over time under varying lighting conditions as it is based on an average of different effective exposure levels that typically exceed the variation in light that would be experienced between successive images thresholded at a single exposure level. As a result, in a video sequence the virtual augmentation appears significantly more stable with respect to the target object than in conventional systems.

In an embodiment of the present invention, the apparatus is a Sony® Playstation 3® entertainment device, connected to an associated video camera.

Figure 1:
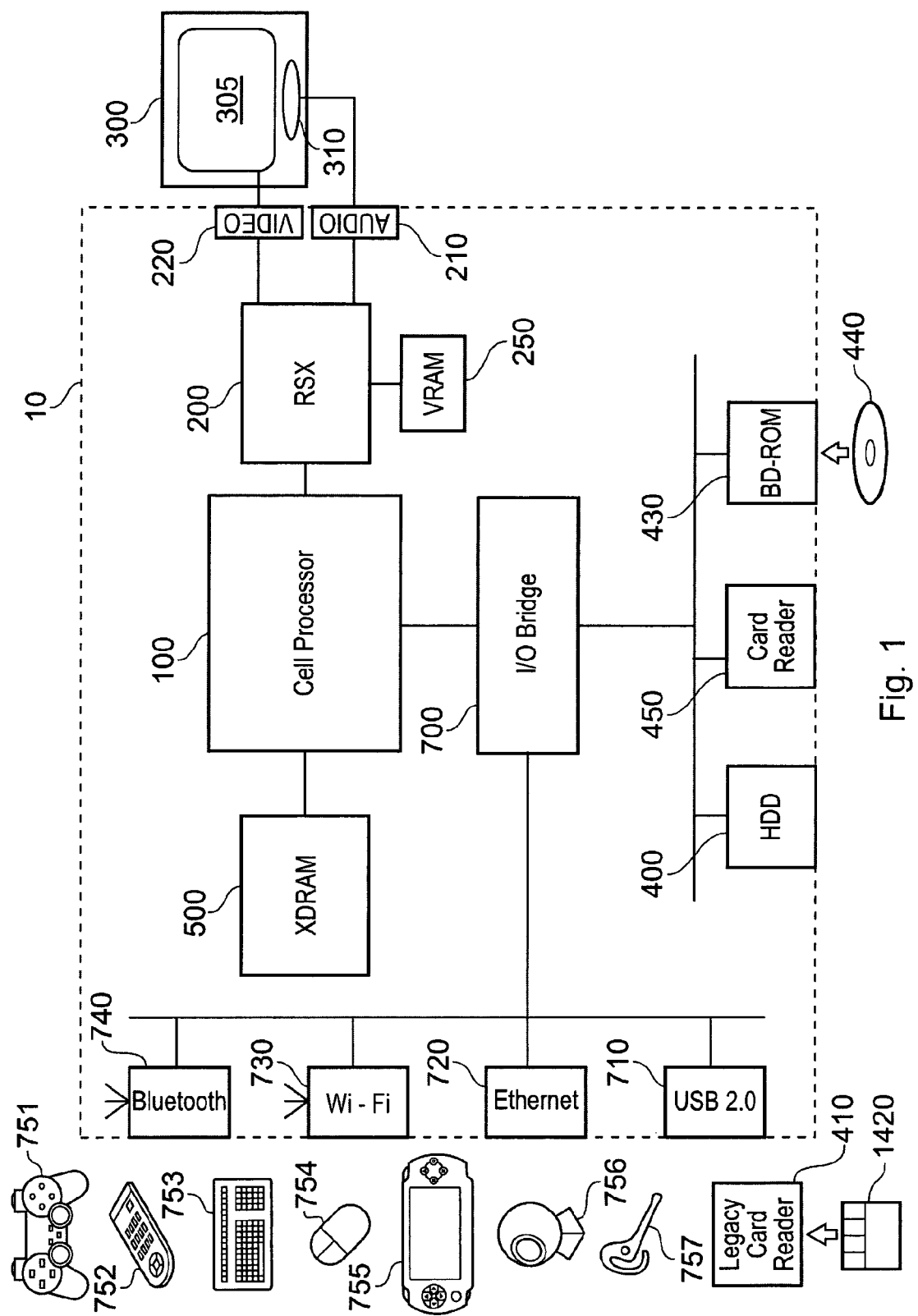
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
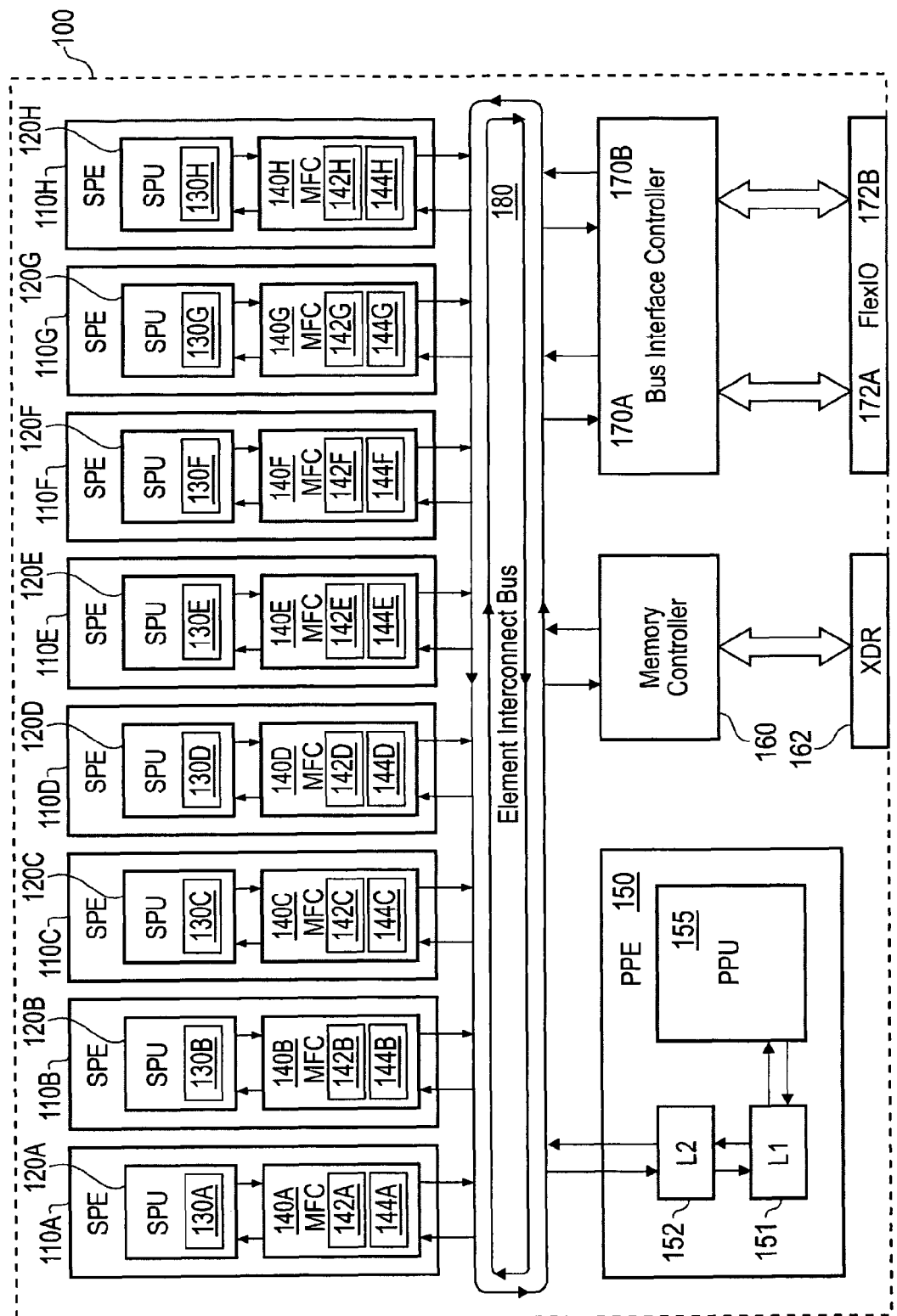
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totalling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96 B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
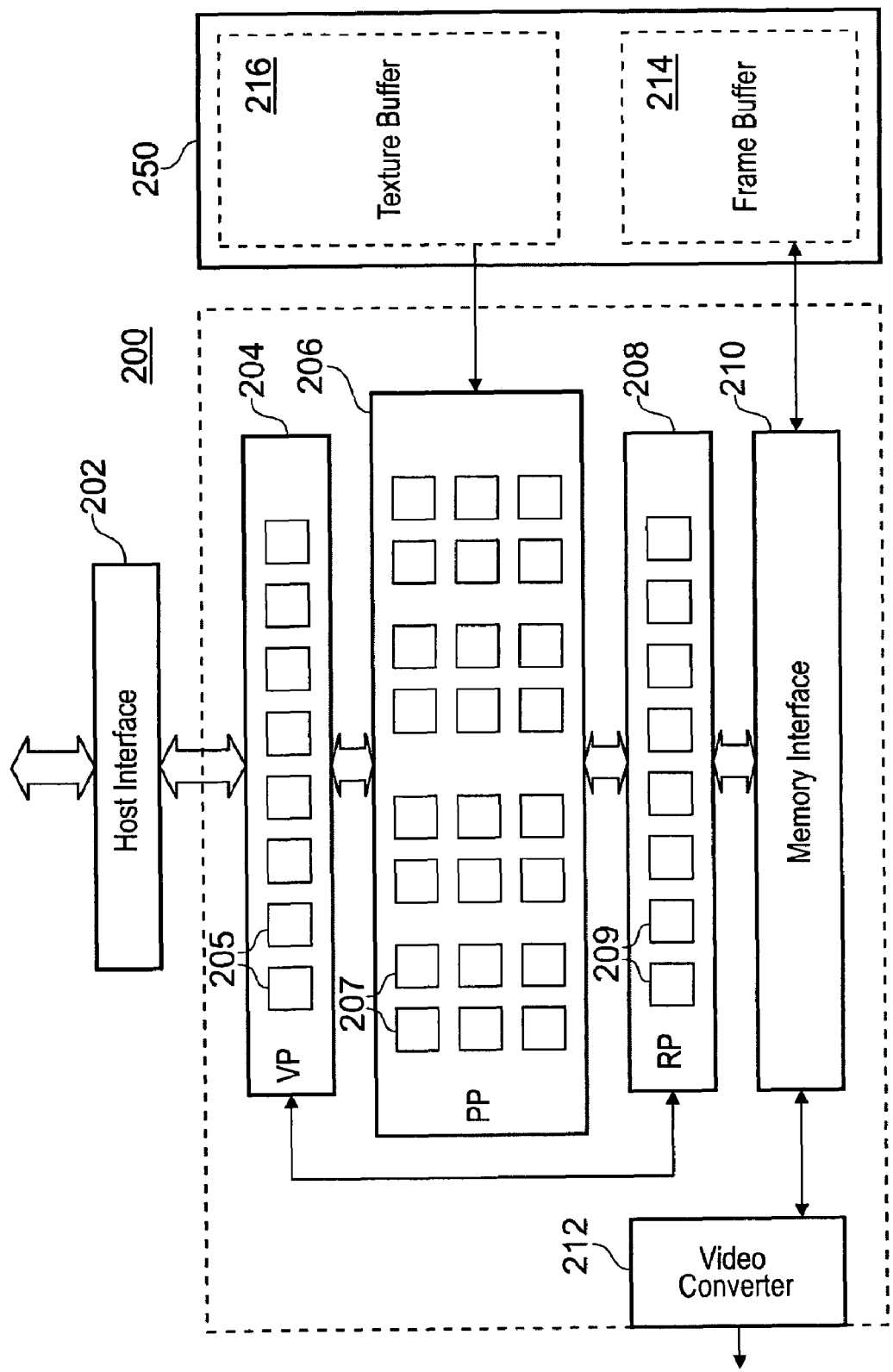
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 4:
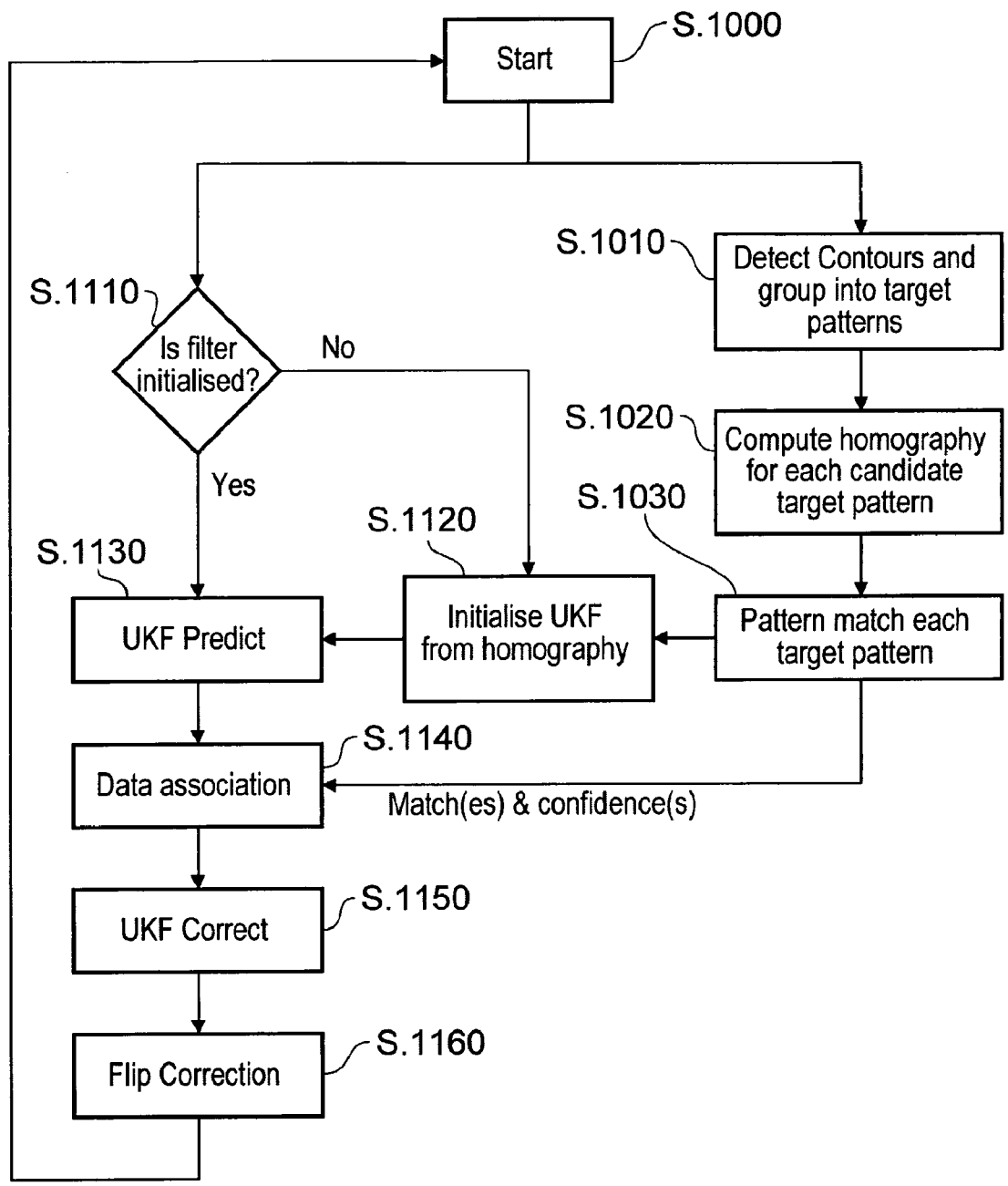
FIG. 4 is a schematic flow diagram of an image augmentation process in accordance with an embodiment of the present invention.

Referring now to FIG. 4, in an embodiment of the present invention the process of determining the position and orientation of a real-world object to which a virtual augmentation is applied can be broken down into two basic parts. Part 1 comprises finding candidate objects, and is implemented by steps s1010 to s1030 of FIG. 4. Part 2 comprises determining their orientation, and is implemented by steps s1110 to s1160 of FIG. 4. In other words, the output of the process shown in FIG. 4 (details of the candidate objects and their orientation) is provided at the output of the step s1160. Then, a third part (not shown) comprises applying the virtual augmentation according to the determined position and orientation.

Parts 1 and 2 are generally implemented in parallel with each other on one or more respective SPUs 120 A-H.

Figure 5:
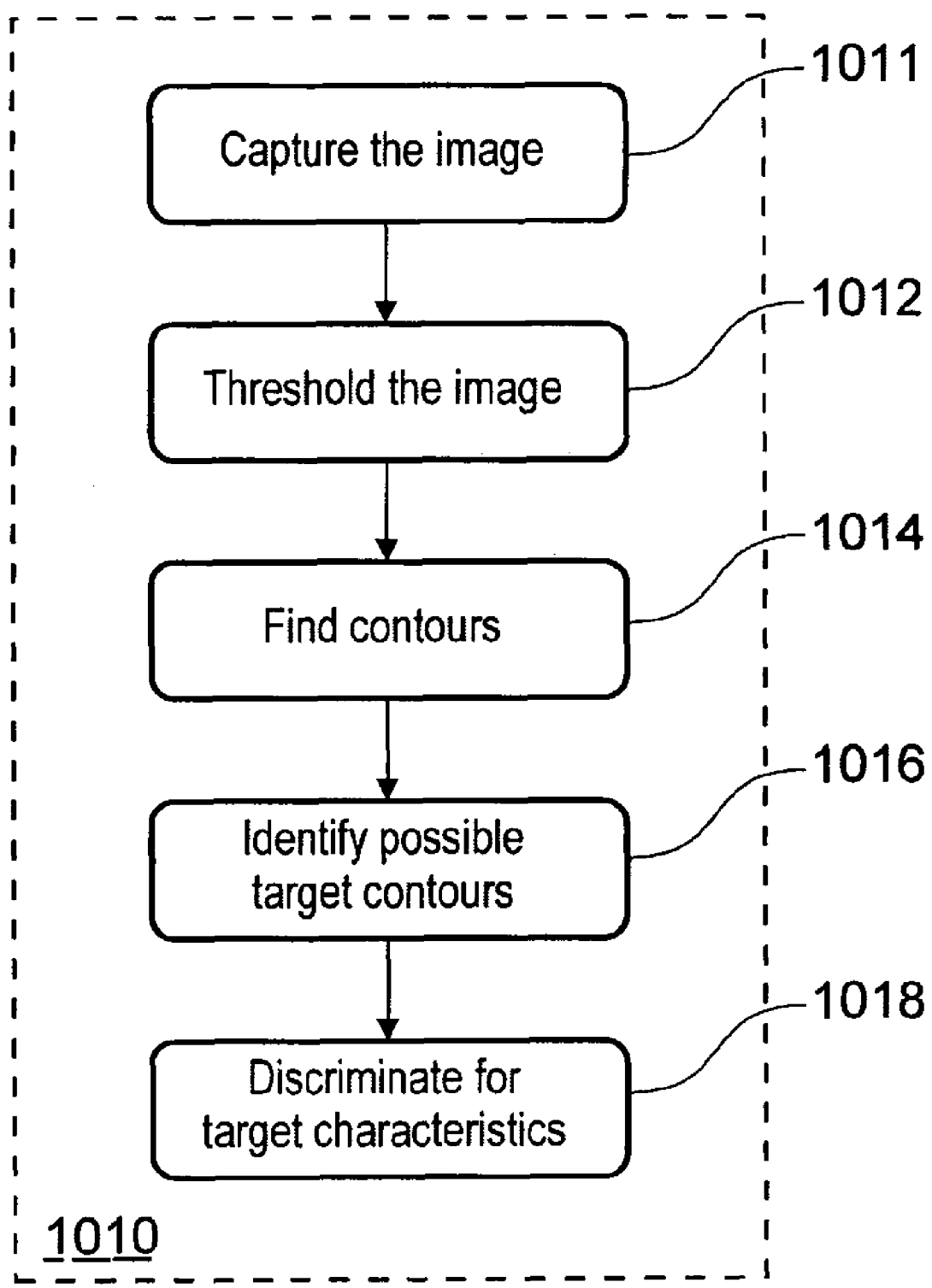
FIG. 5 is a schematic flow diagram of an image analysis process in accordance with an embodiment of the present invention.

Referring now also to FIG. 5, which provides more detail as to the processing carried out by a step s1010, in the step s1010 the contours of a candidate object are detected by first capturing an image in a step s1011, thresholding the captured image to generate a binary or black-and-white image in a step s1012, finding the contours of the binary image in step s1014, finding contours that appear to match a first target pattern in a step s1016, and further discriminating amongst these candidate targets by applying further pattern constraints in a step s1018. In this context, contours represent positions in the image at which the grey-scale values of the pixels cross the selected threshold level.

Referring now also to FIGS. 6A-E, in step s1011 the captured image (FIG. 6A) is typically captured by the video camera 756, giving a grey-scale image 640×480 pixels in size. If a colour image is captured, the colour information can be combined by conventional techniques to provide a grey-scale image for subsequent processing, or alternatively the processing to be described below could be carried out on one or more colour representations (e.g. colour differences, colour components or combinations of these), in which case the term "brightness" would be interpreted as a measure of the amount of such a colour representation.

In the step s1012, this grey-scale image is then thresholded. In other words, pixels of the grey-scale image are compared to a brightness threshold. Pixels having a brightness below the threshold are treated as black, and pixels having a brightness above the threshold are treated as white, although the labels are not important, and a more generic "first state" and "second state" could be used in place of "black" and "white". Multiple threshold levels are used, as shown by the respective thresholded images in FIGS. 6B to 6E, which have threshold levels progressively varying between a value near to black level (FIG. 6B) through to a value close to white level (FIG. 6E).

The point within the grey-scale range at which to set the binary threshold between black and white pixels corresponds to an effective 'exposure' of the binary image. This is an analogy with the exposure used in an analogue or digital image capture process, in that setting the threshold close to the black end of the grey scale range results in a predominantly white image (FIG. 6B), looking over-exposed. Conversely, setting the threshold close to the white end of the grey scale range results in a predominantly black image (FIG. 6E), looking under-exposed. In either case a target object 2010 (FIG. 8) having black and white areas, such as a white card with a black square on it, may be either emphasised (FIGS. 6C and 6D) or adversely affected (FIGS. 6B and 6E) by the threshold chosen. This is dependent upon whether the chosen threshold falls between the captured grey-scale values for the black and white parts of the target object, which in turn depend upon the lighting conditions in the environment of the scene and the apparent size of the object with respect to the image resolution; factors which are of course beyond the control of the thresholding arrangement.

Consequently, in an embodiment of the present invention, in the step s1012 the grey-scale image is thresholded at a plurality of exposure (brightness threshold) levels, and the resulting plurality of binary images, each with a different effective exposure, are each analysed over the steps s1014-s1018.

Figure 6A:
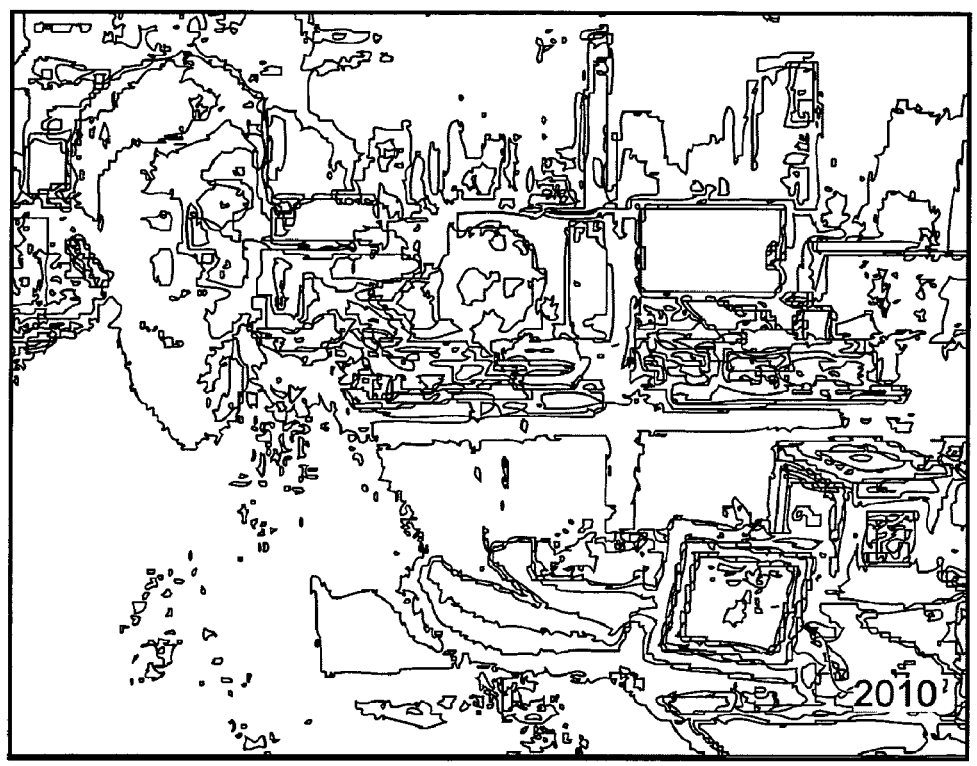
Figure 6B:
Figure 6C:
Figure 6D:
Figure 6E:

An example of the processing is illustrated in FIGS. 7A-C, based upon the binary image of FIG. 6D. In this example, at the step s1014 the contours of the binary images are found, generating a contour image as shown in FIG. 7A. This contour detection process can be achieved using conventional edge detectors, such as differentiation operators or Laplace transforms, to generate a contour image, typically with background pixels marked as black (0-value) and contour pixels marked as white (1-value). In general, the target object 2010 is designed so as to generate closed contours in the contour image, such as a square or circle; this is relevant to the subsequent processing, to be described further below.

In an alternative embodiment, the steps s1012 and s1014 can be combined to take the grey-scale image and isolate contours within the image at the selected exposure threshold level. This is achieved by applying the following process for each pixel:

Define $Pixel_{current}$=current pixel under analysis
$Pixel_{right}$=pixel directly to the right of current pixel
$Pixel_{below}$=pixel directly below current pixel
Then $P_C$=true if $Pixel_{current}$>Threshold
$P_R$=true if $Pixel_{right}$>Threshold
$P_B$=true if $Pixel_{below}$>Threshold
Finally, $Pixel_{output}$=($P_C$ XOR $P_R$) OR ($P_C$ XOR $P_B$)

Thus the output for a pixel is set to 'true' if it is at the edge of a region that exceeds the threshold, as determined by the pixels to the right and below the test pixel. Put simply, the output pixel is set to 'true' if not all three of $Pixel_{current}$, $Pixel_{right}$ and $Pixel_{below}$ are together either above or below the threshold. Finally, it will be appreciated that other pixels (e.g. the directly below-right pixel) could also be incorporated in an equivalent test.

At the step s1016, contours that could correspond to the target object are identified. In an embodiment of the present invention, a so-called tracer function is applied to a contour image. A tracer function traces contours to determine if they return to the same position, thereby denoting a closed contour. The tracer function can also eliminate contours that do not conform to an expected geometry; for example, a contour corresponding to a quadrangle-shaped object should result in a closed contour that involves all left- or all right-turns, whilst a contour corresponding to a circle-shaped object should not involve straight lines. A tolerance limit, such as 5% of the length of the detected contour not conforming to such constraints, may be included to account for noise, or partial occlusion (for example if the object is a playing card and so regularly has a user's thumb over part of the card in the captured image). Candidate objects identified in the step s1010 as possible closed contours corresponding to the target object 2010 are shown in FIG. 7B.

Such tracer functions can be implemented in parallel on some of the SPUs 120A-H, and also several can run on a single SPU. In this latter case, the trace processes can be interleaved to reduce the impact of memory access times and/or branch decision times for each trace.

In an embodiment of the present invention, the number of traces can be reduced by exploiting the feature that the above process is applied to a plurality of binary images with different effective exposure thresholds. A way in which this can be achieved will now be described.

For most exposure threshold values, or at least for one pair of adjacent threshold values, it can normally be assumed that the markings on a given target object will be discernable for adjacent exposure thresholds. Therefore the contours corresponding to these markings can also be expected to be discernable for adjacent exposure thresholds. Therefore contours that do not substantially correspond to one another between adjacent thresholds can be removed as a further discriminating step, i.e. before the tracer functions are applied. This usefully discriminates in favour of contours generated by high-contrast features in the original image (where the step-change in brightness within such features is greater than the step change in grey-scale threshold between adjacent thresholds), but against contours generated by surfaces with graduated grey-scales, where the step-change in grey-scale threshold translates to a spatial change in where the threshold falls within the source image.

This process is generally not carried out in a serial manner moving from threshold level to threshold level, or depending on which end of the threshold scale it starts, it could result in the deletion of all of the contours. Rather, the test is applied so that a contour survives the test if a similar contour is present in the contour image generated in respect of either adjacent threshold value. The way in which a "similar" contour may be detected will be described below.

In an embodiment of the present invention, this discrimination is implemented by generating a low-resolution 'OR' map of each contour image. In other words, pixels in the contour image are divided into groups, and an OR function is used so that if any one of the pixels in a group indicates the presence of a contour, a flag corresponding to that group is set to indicate the presence of a contour. For example, if square groups of four pixels are used, then if one in the four pixels of contour image A is white, set the corresponding 'OR' map pixel white. An AND operation is then applied between the OR maps for pairs of contour images derived using adjacent threshold values, to generate a correspondence mask. The correspondence mask will then denote where contours approximately overlap in both of the contour images under test. The correspondence mask (upscaled back to the resolution of the contour maps) can then be used to perform an AND operation with the original contour images to remove all contour pixels that do not pass this test, i.e. which do not approximately overlap between the adjacent exposure thresholds. For a greater tolerance of positional correspondence, a one-in-nine resolution OR mask, or a one-in-sixteen resolution OR mask, etc., can be used for each contour image. It will be appreciated that alternatively the OR mask can have the same resolution as the binary image, but square groups of 4, 9, 16, etc., pixels are set white or black as appropriate.

At the step s1018, the remaining candidate contours are analysed to isolate those corresponding to the target object or objects.

Referring now also to FIG. 8, the target object 2010 typically comprises markings that produce a bold, high-contrast border. The resulting contours 2021, 2022 have the characteristic that they are concentric. Thus an economical analysis of candidate contours is to discard any contours that do not form part of a substantially concentric pair within a test area 2020. The resulting set of contours detected to be likely to represent the target object in the ongoing example is illustrated in FIG. 7C.

Alternative arrangements of contours readily amenable to such analysis will be apparent to a person skilled in the art, such as a prescribed relative distance between two neighbouring contours, and/or a prescribed size ratio between two neighbouring contours.

In general, the target object is designed so that a detection of the target object involves the detection of two or more contours in a characteristic relationship (e.g. a concentric pair of contours). This arrangement is used because most simple geometric forms such as a rectangle could also occur by chance in general background scenes, such as rectangular computer screens, doors and windows, or circular plates and light fittings.

The result of the step s1018, in general terms, is a plurality of target object contour estimates—i.e. identifications of contours which may correspond to the target object—one (or more) for each of the plurality of differently thresholded binary images. It will be appreciated of course that some threshold values may not result in the detection of target object contour estimates.

It will also be appreciated that alternative edge detection and contour tracing algorithms may be employed in order to derive candidate contours for a plurality of binary images, each with a different effective exposure. It will also be appreciated that such an alternative contour tracing algorithm may not require an explicit edge detection step if it utilises features of the binary image directly.

Advantageously, the plurality of contour estimates, each based upon a different effective exposure level, can be used to mitigate an effect found in augmented reality systems known as 'jitter'. In a conventional augmented reality system, a single estimate of the object position is made for each frame, and is used to determine the placement of any virtual augmentation. However, due to variations in lighting, changes in the contrast levels of the target object as it is moved, and noise and quantisation effects in the video capture, the contour estimate of the object is typically slightly inconsistent between video frames. As a result, a virtual object positioned with respect to the target object appears to move or jitter in response to these small variations. This effect has previously been reduced by adding memory to the position estimator, so that the current position estimation is combined with one or more previous estimates to smooth out the variations; however, this has the effect of making the virtual augmentation appear sluggish in responding to actual movements of the target object.

By contrast, in embodiments of the present invention, the plurality of contour estimates for different exposure thresholds of a target object in a single video frame is averaged by determining a best fit to all the different available contour estimates.

The average is performed by grouping the contours over the different thresholds for each target object in the image (e.g. by relative proximity). For each contour group, the set of lines representing each side of the (square or rectangular) objects is subjected to a best fit algorithm to determine an average line. The points of intersection of these best fit lines identify the corners of the "average" contour for the target object. Other best fit algorithms will be apparent to the person skilled in the art for other object shapes.

This best-fit, or averaged, contour is more robust to inter-frame changes in contrast and noise, because it is based upon contours from an effective range of exposures that is wider than the typical inter-frame change in lighting conditions; meanwhile contour changes caused by image noise are largely uncorrelated for different exposures as there is generally no structural correspondence between noise artefacts at different brightness levels, and so average out. As a result, inter-frame jitter is significantly reduced, making the relationship between the target object and the virtual augmentation appear more real to the viewer.

FIGS. 9A and 9B illustrate how a best-fit algorithm replaces a plurality of positional estimates with one average positional estimate. In particular, FIG. 9A schematically illustrates a set of contours derived from the single image (of FIG. 6A) using different respective threshold values. Each contour is represented by a set of four lines, with the intersections of these lines being indicated by dots at the corners. Each of the lines is subject to a best fit algorithm as described above, to generate the "average" contour shown as a bold white line (for the outside of the border of the object 2010) and a clack line (for the inner edge of the border of the object 2010) in FIG. 9B.

It will be appreciated that where conditions in the original image frame are sufficiently adverse that only one instance of a candidate contour pair is found over the plurality of contour images, then the algorithm will use that contour pair directly in place of a best fit or averaged contour.

In step s1020, for the best-fit contour of each candidate object, a homography is computed. In geometry, a homography is a transform that maps one viewpoint to another. In the illustrated case of FIGS. 7 and 8, this corresponds to a transform that maps the contour to a face-on template of the target object. Typically the mapping is a function of rotation and translation. In conjunction with relative scale with respect to the template, this homography then enables a corresponding rotation, translation and scale of a virtual object to lie directly upon the target object.

Step s1030 discards any candidate objects that cannot be made to fit the template to within an adequate level of tolerance, and returns confidence levels for the accuracy of any matches made. The objects are evaluated by using their respective homography to map a reference image of the target object onto the captured image, and then comparing the two; for example by computing a sum of pixel differences (e.g. a sum of absolute pixel differences) over the relevant region of the image. Confidence levels are then determined from this sum of differences. If the sum exceeds a threshold value, then the candidate object is discarded. It will be appreciated that any suitable comparison metric will suffice.

If the contour of the target object is rotationally symmetrical, then in an embodiment of the present invention an asymmetric pattern 2031 (FIG. 8) is included on the object and step s1030 is applied for different orientations of the object. For the square target object illustrated as an example in the accompanying Figures, this will result in step s1030 being repeated four times, with the reference image rotated another 90° each time. The rotation with the lowest difference measure (by virtue of comparing pixels of the asymmetric pattern on the object) is then chosen as indicating the most likely orientation of the object.

The final result of step s1030 is a confidence measure in the computed homography for each successfully identified target object, and optionally an indication of the orientation of the target object if its contours have one or more planes of symmetry.

In some embodiments of the present invention, the orientation determining process of step s1030 is not performed for every frame as it is computationally expensive, whereas it is reasonable to assume that a target object will not rotate by 90° within the $\frac{1}{30}^{th}$ or $\frac{1}{60}^{th}$ of a second between image frames.

Referring again to FIG. 4, in an embodiment of the present invention the augmented reality process uses the position and orientation data from the above estimation process to update an unscented Kalman filter. This non-linear version of the Kalman filter provides a continuously updated estimate of the position, orientation, velocity and angular velocity of the target object.

In a step s1110, if the filter has not already been initialised, then the homography associated with the best contour match (highest confidence level) for each target object is used to initialise the filter at a step s1120, and as a further part of the step s1120 the filter is then iterated over successive video frames until the filter prediction error converges below a tolerance threshold.

Once the prediction error has reached an acceptable level, a prediction of the position, orientation, velocity and angular velocity of the or each target object is made in a step s1130.

In a step s1140, this prediction is compared with the current position and orientation estimated from the current homography (i.e the output of the step s1030), and in a step s1150 the filter is updated (corrected) in accordance with the observations.

Referring now also to FIGS. 10A and 10B, the contour of a target object can often be validly interpreted as having more than one possible orientation, even if the rotation has been correctly determined. However, in general only one of these orientations will be consistent with the observed motion of the target over time. Consequently, in an embodiment of the present invention, the current model built by the unscented Kalman filter is tested at step s1160 to determine if an alternative homography (and hence orientation) is more accurate.

In the step s1160, the current state of the filter is stored, along with the current filter estimation error. An estimate of the rotation of the contour derived from the current homography is also stored. The filter is then re-initialised using the new rotation estimate from the homography, whilst keeping the original translation estimate of the filter. Thus in effect the filter is made to 'forget' its current rotation model. The filter is then iterated until its error estimate stops changing significantly. If the new estimation error is smaller than the stored estimation error, then the filter keeps the new initialisation; otherwise, it is restored to the stored state.

Once the predicted position, rotation and velocities have been validated in this fashion, this information can be used to position virtual augmentations with respect to the target object. Typically this will take the form of a virtual object appearing to be attached to the target object (e.g. a game character standing on a target object), or can be used to inform the positioning and orientation of a separate virtual object that may or may not be attached to the target object; for example, the positioning and orientation of the target object may be used to position and orientate a virtual railway track, enabling construction of a virtual railway set by the placement of multiple target objects in a room.

In an embodiment of the present invention, in operation the image analysis system is scalable according to performance requirements by altering the number of brightness threshold levels used and hence the number of binary images to analyse. For example, if a system requires a low-latency output (e.g. analysis every $\frac{1}{60}^{th}$ second), a reduced number of brightness threshold levels can be used to reduce latency. This approach can be automated by comparing a target latency with actual latency for the last one (or more) input image, and adjusting the number of brightness threshold levels accordingly. This approach assumes that the complexity of the input image (which is the likely source of variation in latency) will be generally consistent between consecutive input images.

Finally, it will be appreciated that in embodiments of the present invention, elements of the above process and implementations of the operating apparatus may be implemented by the reprogramming of one or more processors within a device such the Playstation 3 games machine. As such, the required adaptation to existing parts of a conventional equivalent device may be implemented in the form of a computer program product comprising processor implementable instructions stored on a machine-readable data carrier or storage medium such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

The invention claimed is:

1. A method of analysing a captured digital image comprising an instance of a target object, the method comprising the steps of:

for each of a plurality of different brightness threshold levels, generating contours from the captured digital image that indicate where in the captured digital image the pixel values of the captured digital image cross the respective brightness threshold level;

identifying instances of a contour corresponding to a characteristic feature of said target object, the instances being detected at similar image positions in the contours derived using at least two of the respective brightness threshold levels; and estimating a homography which maps the characteristic feature of the target object to its representation in the captured image, based upon the two or more instances of that target object's corresponding contour.

2. A method according to claim 1, in which the step of generating contours for a respective brightness threshold level comprises the steps of:

applying that brightness level as a threshold to the captured digital image so that pixels below the threshold are set to a first state and pixels above the threshold are set to a second state; and applying an edge detection algorithm to the resulting two state image to generate a given contour corresponding to image positions where the pixel values of the captured digital image change between the first state and the second state.

3. A method according to claim 1, in which the step of generating contours for a respective brightness threshold level comprises the steps of:
for each pixel of the captured image:
comparing the pixel and at least a vertically aligned and a horizontally aligned neighbour with the selected respective brightness level; and
marking the corresponding pixel of a contour image as being part of a given contour if all three compared pixels are neither all above nor all below the selected respective brightness level.

4. A method according to claim 1, further comprising the steps of:
for neighbouring pairs of selected brightness levels, segmenting the corresponding contour images into areas of a predefined size and, for each such segmented area, identifying whether a given contour exists anywhere within that segmented area; and
discarding those contours that lie in segmented areas where the corresponding segmented area from the other contour image does not also comprise a contour.

5. A method according to claim 1, wherein:
the characteristic feature of the target object comprises a closed shape having two or more edges satisfying a characteristic relationship; and
the step of identifying instances comprises the steps of:
detecting closed contours; and
selecting, as candidate instances, the closed contours that satisfy the characteristic relationship to within a predetermined tolerance.

6. A method according to claim 5, in which the characteristic relationship includes one or more selected from the list consisting of:
i. contours representing edges of the closed shape being a pair of concentric contours;
ii. contours representing edges of the closed shape being a pair of contours separated by a predefined relative distance; and
iii. contours representing edges of the closed shape being a pair of contours of a predefined size ratio.

7. A method according to claim 1, in which the step of estimating a homography comprises the steps of:
detecting a best-fit shape providing the overall best-fit to the two or more instances of the contour corresponding to said characteristic feature; and
estimating the homography based upon the detected best-fit shape.

8. A method according to claim 7, in which the step of determining a best-fit shape comprises the steps of:
detecting a line of best fit for each respective set of corresponding line segments of the two or more instances of the contour corresponding to the characteristic feature; and
detecting an overall best-fit shape corresponding to the detected lines of best fit when bounded by their points of intersection.

9. A method according to claim 7, further comprising the steps of:
rotating a reference image of the characteristic feature of the target object for each possible angle at which the characteristic feature is rotationally symmetrical;
for each such possible angle, transforming a reference image of the target object based upon the homography;
comparing the transformed reference image of the target object with the target object in the captured image; and
selecting the angle that produces the closest comparison as the most likely orientation of the characteristic feature in the captured image.

10. An image analysis apparatus for analysing a captured image comprising an instance of a target object, the apparatus comprising:
an image processor operable to generate, for each of a plurality of different brightness threshold levels, contours from a captured digital image that indicate where in the captured digital image the pixel values of the captured digital image cross the respective brightness threshold level;
a feature identifier operable to identify instances of a contour corresponding to a characteristic feature of said target object, the instances being detected at similar image positions in the contours derived using at least two of the respective brightness threshold levels; and
a homography transform estimator operable to estimate a homography which maps the characteristic feature of the target object to its representation in the captured image based upon the two or more instances of that target object's corresponding contour.

11. Apparatus according to claim 10, in which the image processor comprises:
a brightness level thresholder operable to apply a selected brightness level as a threshold to the captured digital image so that pixels below the threshold are set to a first state and pixels above the threshold are set to a second state; and
an edge detector operable to detect edges of the resulting two state image to generate a given contour corresponding to image positions where the pixel values of the captured digital image change between the first state and the second state.

12. Apparatus according to claim 10, in which the image processor comprises:
a pixel comparator operable to compare a pixel and at least one vertically aligned and one horizontally aligned neighbouring pixel with the selected respective brightness level; and
a pixel value setter operable to mark the corresponding pixel of the contour image is as being part of a given contour if all three compared pixels are neither all above nor all below the selected respective brightness level.

13. Apparatus according to claim 10, in which the image processor comprises:
an image segmenter operable with respect to contour images corresponding to neighbouring pairs of selected brightness levels to segment the two selected contour images into segmented areas of a predefined size, and for each segmented area to identify whether a given contour exists anywhere within that segmented area; and
an image modifier operable to discard contours within segmented areas where the corresponding segmented area from the other contour image does not also comprises a contour.

14. Apparatus according to claim 10, in which:
the characteristic feature of the target object comprises a closed shape having two or more edges satisfying a characteristic relationship; and
the feature identifier comprises:
a detector operable to detect closed contours; and
a contour selector operable to select as candidate instances, closed contours that satisfy the characteristic relationship to within a predetermined tolerance.

15. Apparatus according to claim 14, in which the characteristic relationship includes one or more selected from the list consisting of:
   i. contours representing edges of the closed object being a pair of concentric contours;
   ii. contours representing edges of the closed object being a pair of contours separated by a predefined relative distance; and
   iii. contours representing edges of the closed object being a pair of contours of a predefined size ratio.

16. Apparatus according to claim 10, in which the homography transform estimator comprises:
   a best-fit detector operable to detect a best-fit shape providing the overall best-fit to the two or more instances of the contour corresponding to said instance of the characteristic feature.

17. Apparatus according to claim 16, in which the best-fit detector comprises:
   a best line of fit detector operable to detect a line of best fit for each respective set of corresponding line segments of the two or more instances of the contour in turn corresponding to said instance of the characteristic feature; and
   a line intersection detector operable to detect an overall best-fit shape corresponding to the detected lines of best fit when bounded by their points of intersection.

18. Apparatus according to claim 16, in which the best-fit detector comprises:
   an image rotator operable to rotate a reference image of the characteristic feature of the target object for each possible angle at which the characteristic feature is rotationally symmetrical;
   a reference image transformer operable to transform the reference image of the target object for each such possible angle, based upon the homography;
   an image comparator operable to compare the transformed reference image of the target object with the target object in the captured image; and
   an angle selector operable to select the angle that produces the closest comparison as the most likely orientation of the characteristic feature in the captured image.

19. A non-transitory computer-readable medium having instructions stored thereon, the instructions, when executed by a processor, cause the processor to perform a method of analysing a captured image comprising an instance of a target object, the method comprising:
   for each of a plurality of different brightness threshold levels, generating contours from the captured digital image that indicate where in the captured digital image the pixel values of the captured digital image cross the respective brightness threshold level;
   identifying instances of a contour corresponding to a characteristic feature of said target object, the instances being detected at similar image positions in the contours derived using at least two of the respective brightness threshold levels; and
   estimating a homography which maps the characteristic feature of the target object to its representation in the captured image, based upon the two or more instances of that target object's corresponding contour.

20. The non-transitory computer-readable medium of claim 19, the method further comprising:
   rotating a reference image of the characteristic feature of the target object for each possible angle at which the characteristic feature is rotationally symmetrical;
   for each such possible angle, transforming a reference image of the target object based upon the homography;
   comparing the transformed reference image of the target object with the target object in the captured image; and
   selecting the angle that produces the closest comparison as the most likely orientation of the characteristic feature in the captured image.

* * * * *